United States Patent [19]

Poler

[11] 4,377,329
[45] Mar. 22, 1983

[54] CONTACT LENS OR THE LIKE

[76] Inventor: Stanley Poler, 78 E. Second St., New York, N.Y. 10003

[21] Appl. No.: 124,941

[22] Filed: Feb. 26, 1980

[51] Int. Cl.³ .............................................. G02C 7/04
[52] U.S. Cl. ............................................... 351/160 R
[58] Field of Search .............. 351/160 H, 160 R, 161, 351/177; 3/13, 13 A

[56]  References Cited
U.S. PATENT DOCUMENTS

| 3,594,074 | 7/1971 | Rosen | 351/160 R |
| 3,973,838 | 8/1976 | Page | 351/160 H |
| 4,080,709 | 3/1978 | Poler | 3/13 A |
| 4,095,878 | 6/1978 | Fanti | 351/161 |
| 4,122,556 | 10/1978 | Poler | 3/13 A |
| 4,126,904 | 11/1978 | Shepard | 351/160 R |
| 4,171,878 | 10/1979 | Kivaev et al. | 351/160 H |
| 4,332,443 | 6/1982 | Thomas | 351/160 H |

FOREIGN PATENT DOCUMENTS

| 908135 | 8/1945 | France | 351/160 R |
| 946877 | 12/1948 | France | 351/160 H |

Primary Examiner—John K. Corbin
Assistant Examiner—Scott J. Sugarman
Attorney, Agent, or Firm—Hopgood, Calimafde, Kalil, Blaustein & Judlowe

[57] ABSTRACT

The invention contemplates improved extraocular-lens structures for contact with the cornea of a human eye, to be worn in place of spectacles. The construction features a lens element of requisite prescription power but of diameter which substantially equals or only slightly exceeds the fully dilated pupil size of the wearer, and fenestrated haptic structure engaged to the lens extends radially outwardly and is so thin and axially compliant as to be self-conforming to the curvature of the cornea and to effectively adhere thereto, thus stabilizing the lens for retention of its position on the optical axis of the eye.

33 Claims, 13 Drawing Figures

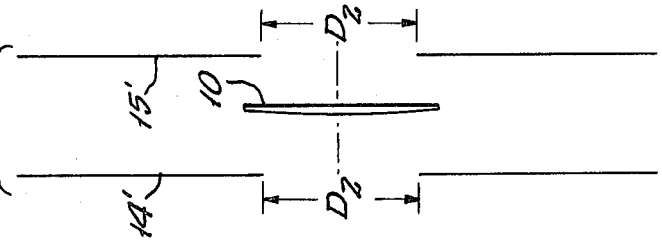
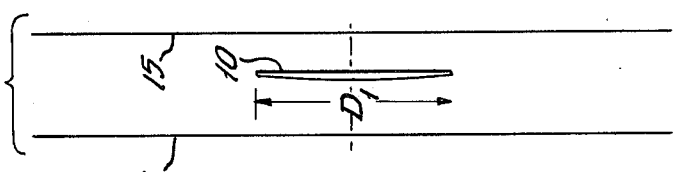
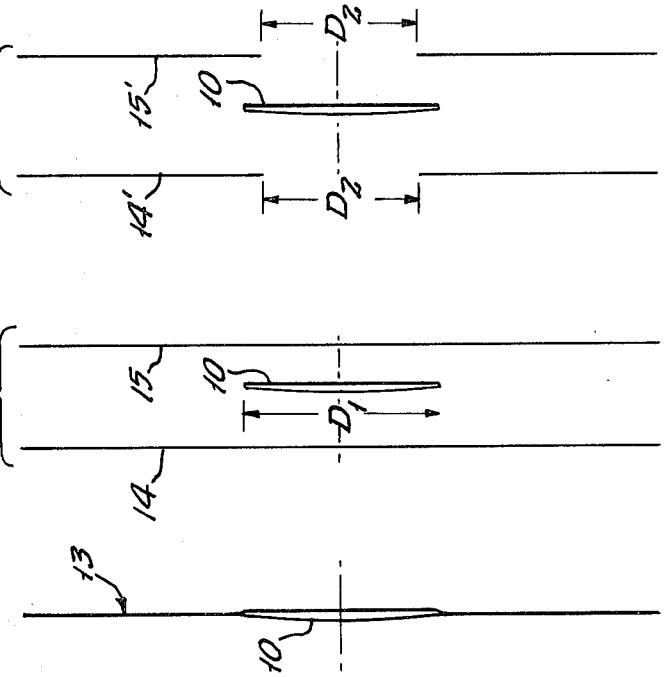
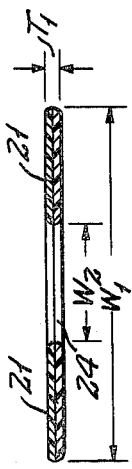
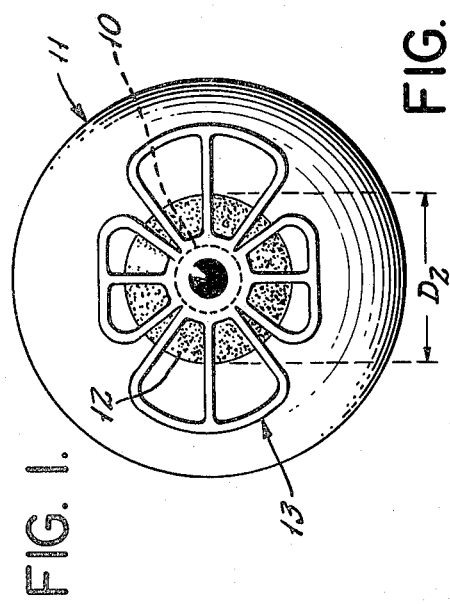
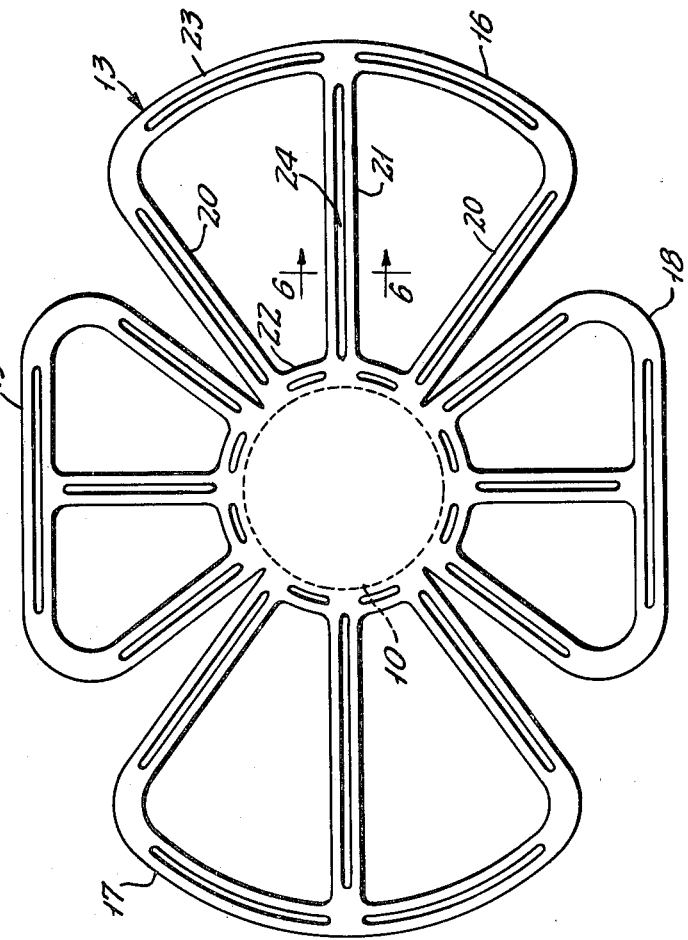

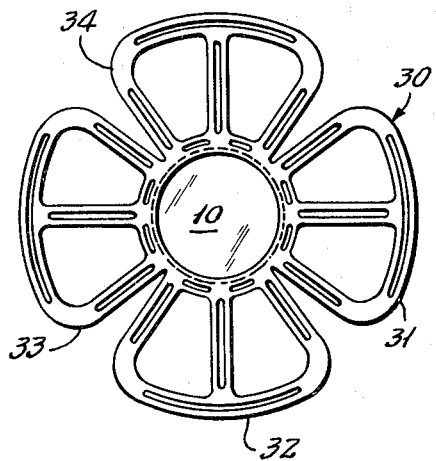
FIG. 7.
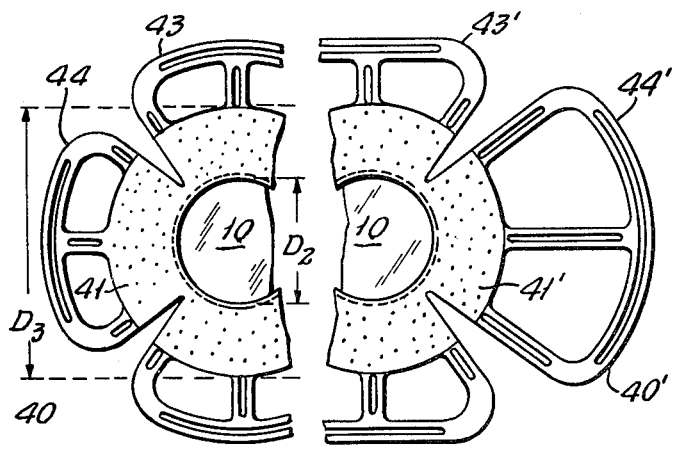
FIG. 8.  FIG. 8A.
FIG. 10.  FIG. 10A.
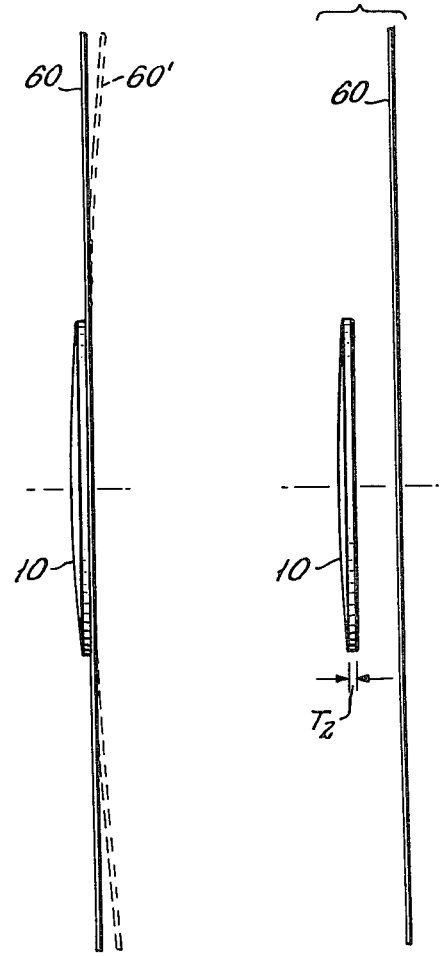
FIG. 9.  FIG. 9A.
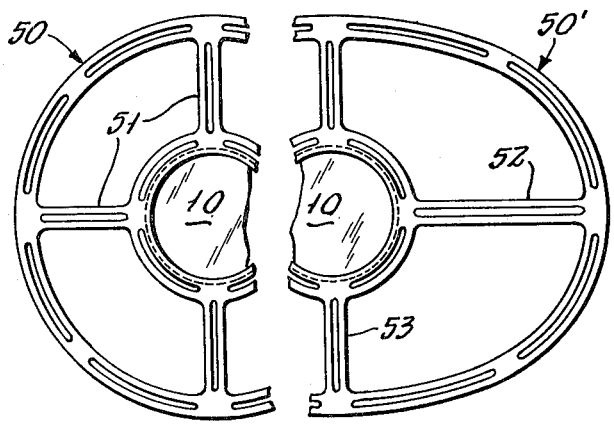

CONTACT LENS OR THE LIKE

BACKGROUND OF THE INVENTION

This invention relates particularly to extraocular lens structures for contact application to the cornea, for wear in place of spectacles.

Conventional contact lenses, be they of the hard or soft variety, are circular, of 12 to 14 mm diameter, and thus cover a relatively large area, approximating the area defined by the perimeter of the iris. They are larger than optically necessary because the only light rays they need accommodate are those permitted by the pupil, and their relatively large area is a source of discomfort because fluid on the cornea is thereby precluded natural flow and circulation; as a consequence, the wearer of contact lenses must accustom himself to relatively frequent removal, cleaning and replacement of his lenses. But if the conventional contact lens were any smaller, it would be virtually incapable of manipulation by the wearer, and it would also be prone to move off-axis, over the corneal surface. Furthermore, liquid and gas-permeable plastics have recently been used, but lenses of such materials tend to build enzyme deposits and present difficulties in regard to cleaning and sterilization.

As far as I am aware, glass has been foreclosed as a contact-lens material, due to its high density and fragility compared to that of plastic materials. And the manufacture of contact lenses has involved plastic-molding techniques where prescription curvatures are derived from a molding cavity, or by lathe-cutting, i.e., they are not expressly not ground into the lens itself. And being circular, there is no way that astigmatism can be corrected through conventional contact lenses because there is no way of identifying orientation parameters of the astigmatism.

BRIEF STATEMENT OF THE INVENTION

It is an object to provide an improved extraocular or contact-lens construction.

It is a specific object to provide such a construction wherein the lens element itself may be of substantially smaller size, consistent essentially only with its optical requirements, and wherein haptic structure engaged to the lens element provides stabilized positioning for the lens element.

Another specific object is to meet the above objects with structure which is readily self-adapting to the curvature of the cornea.

It is also a specific object to provide structure meeting the above objects and permitting the employment of optically finished glass as the material of the lens element.

A further object is to provide a contact-lens construction inherently capable of supplying astigmatism correction for the wearer.

Still another object is to provide a contact-lens structure of the character indicated that can be cleaned and sterilized by boiling in water or by autoclaving.

It is a further specific object to provide protective structure in a contact lens whereby glass may be safely used as the optical element.

A general object is to meet the above objects with relatively simple structure which lends itself to quantity and precision manufacture, which inherently provides improved comfort to the wearer, and which involves substantially reduced demands for removal, cleaning and replacement.

The foregoing and the other objects and features of the invention are achieved in contact-lens constructions (a) wherein the lens element is of substantially reduced diameter (e.g., 5 to 6 mm), and is thus essentially only of the size required to serve a fully dilated pupil and (b) wherein fenestrated compliant haptic structure engages the lens element and adheres to the wet surface of the cornea for stabilized support of the lens element. The result is a much lighter-weight article, of less bulk than conventional contact lenses, and permitting the use of optically finished glass for the lens element.

BRIEF DESCRIPTION OF THE DRAWINGS

The invention will be illustratively described in conjunction with the accompanying drawings, in which:

FIG. 1 is a simplified front-elevation view of a human eye to which contact-lens structure of the invention has been applied;

FIG. 2 is an enlarged view of the lens structure of FIG. 1 to show haptic detail;

FIG. 3 is a side-elevation view of the structure of FIG. 2;

FIG. 4 is a view similar to FIG. 3 but with the separate parts in exploded relation;

FIG. 5 is a view similar to FIG. 4 to show a modification;

FIG. 6 is a sectional view, taken at 6—6 of FIG. 2 and on a further-enlarged scale;

FIG. 7 is a view similar to FIG. 2, to show a modification;

FIGS. 8 and 8A are fragmentary views, otherwise similar to FIGS. 7 and 2, respectively, to show further modification;

FIGS. 9 and 9A are similar to FIGS. 8 and 8A, to show further modification; and

FIGS. 10 and 11 are views similar to FIGS. 3 and 4, respectively, to show still further modification.

DETAILED DESCRIPTION OF THE INVENTION

In the form of FIGS. 1 to 4, the invention is shown in application to an extraocular or contact-lens assembly comprising a central lens element 10 which may be of molded plastic, but which is preferably of optically finished glass, ground to prescription curvature (e.g., plano-convex or meniscus) and of outside diameter $D_1$ which equals or slightly exceeds the diameter of the fully dilated pupil of a human eye. As is clear from FIG. 1, the diameter $D_1$ is very much less than the diameter $D_2$ of the iris 12 of the eye 11. Generally speaking, the diameter $D_1$, is in the range 5 to 6 mm, and the diameter $D_2$ is in the range of 12 to 14 mm, the latter being the diameter of a conventional contact lens.

Fixed to and centrally supporting the lens element 10 is a haptic 13 of much larger included area than the lens element 10. Haptic 13 comprises two thin sheets 14-15 of plastic material laminated to the front and back surfaces of lens element 10, and to each other in regions radially outside element 10; in these outer regions, haptic 13 is characterized by very substantial fenestration, meaning that the structure is primarily "open", for normal air or "breathing" exposure of the surface of the cornea. Such fenestration may be by photographically delineated milling, before or after lamination of the sheets 14-15 to each other, relying upon such chemical-etching, plasma and other milling techniques as are described for intraocular-lens haptics, in my U.S. Pat. No. 4,080,709.

More specifically, each of the sheets of haptic 13 is seen to be of generally oval or elliptical outer contour and to comprise four radially outward foot formations, there being a first larger pair 16-17 on the major axis and a second shorter pair 18-19 on the minor axis. It is intended that these foot formations be very compliant in the axial direction, to render them self-conforming to the surface of the cornea. Each foot formation, taking formation 16 as typical, comprises angularly spaced outer legs 20 and a central leg 21 integrally connecting an inner hub portion 22 to an outer bridge portion 23; and intermediate their points of interconnection all these elemental areas are slotted, as at 24, to render them even more self-conforming to the surface of the cornea. The sheets 14-15 should be selected for autoclavability and may be of 1-mil or 0.5 mil material, suitably nylon, high-density polyethylene, Mylar*, Teflon*, polyethersulfone, sheet silicone, or H.E.M.A., meaning that in the elemental areas 20-21-22-23, the haptic is of thickness $T_1$ (FIG. 6) in the range of 1 to 2 mils; the width $W_1$ of each of these areas is typically in the order of 10 mils, and slot widths $W_2$ are in the order of 3 mils. The overall dimensions of the haptic blank may suitably be 16 mm. (major axis) by 12 mm. (minor axis). Bonding of the plastic sheets 14-15 to each other may be by suitable ultrasonic, heating or cementing techniques, as applicable.

*Trademarks of the DuPont Company.

Prior to application to the cornea, the foot formations 16-17-18-19 are so axially weak ("floppy") as to be apparently useless as supports for the associated lens element 10. However, once the central lens-bearing region is placed over the pupil, the adjacent floppy regions are drawn, by a self-wetting action akin to surface tension and/or capillary attraction (in the context of surface moisture on the cornea) to lie down on the cornea in conformance to locally adjacent curvature of the cornea. In addition to rendering the elemental areas 20-21-22-23 more compliant, the slotted regions (24) thereof achieve a pump-like coaction with surface liquid on the cornea, with the result that surface liquid is locally displaced and drawn into and through the slotted regions (24), and essentially all haptic area radially outside the lens element 10 has an affinity for the cornea region to which it has "attached" itself by self-wetting. Thus, the relatively narrow and slotted nature of areas 20-21-22-23 promotes displacement of surface liquid, with the attendant benefit of cleaning and lubricating action, particularly when blinking the eyelid over the installed structure. And the 1 to 2-mil haptic thickness encountered by a blinking eyelid is inconsequential, while the lens element remains sufficiently anchored in its installed eye-axis position, it being further noted that, as a result of using the indicated milling techniques, all edges of the haptic formations are smoothly rounded and therefore not a source of irritation. The anchoring effect is enhanced by providing a mildly roughened surface (as by etching) on the posterior side of the haptic areas 20-21-22-23, and the smoothness of eyelid action is enhanced by providing a smooth anterior surface of the haptic; the roughened surface will have been created prior to milling and will have a dull or matte appearance, and the smooth surface will be shiny, thus enabling ready identification of the front and back surfaces of the assembly.

In the form of FIGS. 1 to 4, the sheets 14-15 continuously and intimately cover the respective front and back surfaces of lens element 10. The selected plastic material of sheets 14-15 must therefore be for their transparency, and as noted previously, reliance is upon the lens element 10 for optical properties. Generally, it may be observed that use of plastic material for lens element 10 means an index of refraction substantially less than that of glass. Therefore, production of plastic lens elements 10 will mean greater curvature (shorter radii), and therefore greater lens thickness, then for a glass lens element 10 of the same diopter specification. In the case of the glass lens element 10, optical glasses are commercially available with various indices of refraction in the range 1.5 to 2.0, and I find that by grinding all lens elements 10 (as optically finished plano-convex elements), with the same single radius of curvature (e.g., 300-mm radius), a full range of prescribable diopter powers (at quarter-diopter increments, up to 10 diopters) is available merely by choice of the glass for its particular index of refraction; a single set of lens-grinding tools which grind to a single radius of curvature may be used to implement the foregoing technique involving glasses with different indices of refraction. A similar single-radius approach in grinding negative-lens surfaces will also serve a wide range of diopter prescriptions, through appropriate selection of a particular glass for its index of refraction, as by using a single set of lens-grinding tools which grind to a single radius of curvature. Further, because glass elements 10 may be finished with prescribable grinding eccentricity, astigmatism correction can be provided, the lens element being oriented with its astigmatic-correction axis rotationally displaced to a prescribed angular orientation with respect to, say, the major axis 16-17 upon assembly to and lamination with the haptic parts 14-15; the exposed dull vs. shiny surfaces of the haptic, being recognizably exposed, enable the user to make sure that his installed lens (major axis horizontal, shiny side facing forward) will always be so installed in his eye as to avoid astigmatic ambiguity.

FIG. 5 illustrates a modification wherein each of the haptic sheets 14'-15' is formed with a central aperture of diameter $D_2$, to enable peripheral overlap with the rim of lens element 10; lamination of the sheets 14'-15' and their substantial fenestration radially outside lens element 10 is otherwise as described for FIGS. 1 to 4. The diameter $D_2$ is illustratively 4.5 to 5 mm, to allow such peripheral overlap to the radial extent of 0.5 to 0.75 mm, for the case of a 6-mm diameter $D_1$ of lens element 10.

FIG. 7 depicts an alternative construction, particularly suited to eyes for which no astigmatism is to be corrected. The only significant difference in FIG. 7 is that the outer perimeter of the haptic 30 thereof is generally circular. In other words, all foot formations 31-32-33-34 are alike, and preferably comprise slotted elemental hub, foot, and bridge areas corresponding to areas 20-21-22-23 of FIG. 2.

FIGS. 8 and 8A respectively illustrate circular and elliptically contoured versions of a modified version of the invention, particularly suited to the a-tonic iris, i.e., an eye having no iris or a damaged iris. One or both of the sheets which comprise the haptic 40 (40') is characterized by an opaque annular region 41 (41') extending from the lens-lapping inner diameter $D_2$ to an outer diameter $D_3$ to match the person's other-eye iris diameter. Foot formations 43-44 (43'-44') extend radially outward of the hub region of lens element retention, but the major open fenestration is radially outside the annulus 41 (41'), the "opaque" region 41 (41') being desirably foraminated with apertures of diameter preferably less than substantially 0.005 inch and at least as great as the thickness of region 41 (41'), to permit "breathing" action of the corneal surface covered thereby. Desirably, the "opaque" region is so finished as to color and design as to create the appearance of a normal iris in the afflicted eye.

FIGS. 9 and 9A illustrate modification of the respective circular and elliptical embodiments of FIGS. 7 and 2, wherein the haptic 50 (50') is peripherally continuously a circle or an ellipse or oval. Slotting of elemental areas of haptics 50 (50') is again preferred, as described for FIG. 2. The floppy nature of the continous periphery of both haptics 50 (50') enables continuous intimate attraction to the cornea surface in the manner described for FIGS. 1 to 4, and the plurality of axially compliant radial leg elements 51 (52-53) is preferably at least three, being shown as four, for both FIGS. 9 and 9A.

FIGS. 10 and 10A are directed to an all-glass embodiment of the invention wherein the lens element 10 is an optically finished element, shown as plano-convex and with a cylindrical rim of thickness $T_2$ in the range 1 to 3 mils, preferably substantially 2 mils. The flat posterior side of lens element 10 is mounted, as by fusing or by a suitable cement, to the central region of a sheet glass haptic 60 of thickness in the range 0.5 to 1.5 mils, preferably 1 mil. Fenestration is provided in the haptic region external to lens element 10, in the manner discussed above for the forms of FIGS. 2 and 7, 9 and 9A, as the case may be. The glass haptic 60 is thus substantially as floppy as its plastic counterpart, but it has the advantage of being less susceptible to bacteria-growth phenomena, and therefore less likely or less often to require removal for cleaning and sterilization; its ultimately flexed curvature in adaptation to the cornea is suggested by dashed lines 60.

The described embodiments of the invention will be seen to achieve all stated objects. Importantly, the invention brings light weight and substantially reduced bulk and surface area to the contact-lens art, plus the inherent capability of providing optically finished glass lens elements, with astigmatic correction, if needed; further, photochromic glass at 10 provides a hitherto unavailable feature in a contact lens configuration. Fenestration areas are substantial, radially outside the supported lens element 10, being preferably at least four times the end area of the lens element, such area being taken as within effective perimeter limits of the geometric circular or oval (elliptical) contour to which the foot formations are tangent. Except for the "opaque" annulus 41 (41') of FIGS. 8 and 8A, all other haptic regions and materials are preferably clear and transparent, foot formations of such haptic regions being effectively invisible to the eye of an observer.

Not only does the invention bring above-noted benefits of optically finished glass to the contact-lens art, but an important safety factor is also provided. In embodiments involving plastic-sheet haptics, the plastic sheets of the haptic fully enclose and support the lens element 10 in at least the region of its rim; in other words, it is at least the most delicate and fracturable part of the lens which is protected by such plastic-sheet enclosure. In glass-haptic situations as described in connection with FIGS. 10 and 10A, the haptic sheet 60, being bonded to lens element 10 over its full area, provides reinforcement to the otherwise more fracturable rim region of the lens element 10; in the event that lens element 10 is a meniscus lens, the haptic sheet 60 is preferably centrally open to the diameter $D_2$ (see FIG. 5), but there will be an annular overlap ($D_1$, minus $D_2$) within which sheet 60 and lens 10 are bonded, thus providing lens-rim reinforcement, in addition to the described support and positioning functions of the haptic.

It should be further observed that although curvatures and diopter ranges have been mentioned by way of illustration, these ranges are in no sense by way of limiting the invention. For example, the invention will be seen to have application to aphakic patients, i.e., to those whose cataracted natural lens has been surgically removed but for whom an external lens, rather than an implanted intraocular lens, has been prescribed. Such lenses may be of the structure, nature and combinations herein described, but with a stronger finished optical element 10, e.g., having power in the order of 10 or more diopters. When such stronger lenses are of glass, the thickness of the lens element 10 per se will still be very much less than for a conventional contact lens prescribed for the same situation.

While the invention has been described in detail for preferred forms shown, it will be understood that modifications may be made without departure from the claimed scope of the invention. For example, the technique of retaining an optical element by and between laminated plastic sheets which become the haptic lends itself to intraocular-lens application, so that for example, a configuration as in FIG. 7, and with three or more foot formations within an outer circular locus of 12 to 14-mm diameter may serve well for anterior-chamber implantation, relying upon the foot formations to develop stabilizing support at the scleral ridge (adjacent the base of the iris). Of course, in that event, the haptic sheets should provide a more stiff radial-support action, in that they stand without contact analogous to the described cornea-adherent extraocular applications herein; thus, for intraocular application the overall haptic thickness $T_1$ is preferably about 10 mils, and of course lens curvatures will be of shorter radius in view of the vitreous-humor environment in which such lenses must function.

What is claimed is:

1. A contact lens assembly adapted for self-adherent removable mounting to the cornea of an eye, comprising a circular lens element, and haptic means peripherally engaging and mounting said lens element, said haptic means being of sheet material including integrally formed axially compliant radially outward foot formations extending outward of said lens element at angularly spaced locations, said foot formations being substantially fenestrated and being of such compliant action as to bendably deform in continuous smooth conformance to the surface curvature of the cornea and to adhere thereto solely through contact with natural moisture of the surface of the cornea.

2. The lens assembly of claim 1, in which the locus of outer ends of said foot formations, in flattened state, is a generally circular perimeter of minimum diametral span which is at least no greater than the span of the substantially great-circle arc between conjunctiva limits of the eye.

3. The lens assembly of claim 1, in which the locus of outer ends of said foot formations, in flattened state, is a generally circular perimeter of minimum diametral span in the range 9 to 15 mm.

4. The lens assembly of claim 1, in which said haptic is of fenestrated sheet material, whereby the effective surface area of said haptic is reduced by fenestration radially outside said lens element, the locus of outer ends of said foot formations being a generally circular perimeter, the fenestrated area within said locus being substantially greater than said effective surface area.

5. The lens assembly of claim 4, in which the fenestrated area within said locus is at least four times the end area of said lens element.

6. The lens assembly of claim 1, in which the diameter of said lens element is in the range 5 to 7 mm.

7. The lens assembly of claim 1, in which the diameter of said lens element is no greater than substantially 6 mm.

8. The lens assembly of claim 1, in which the diameter of said lens element is no greater than substantially 5 mm.

9. The lens assembly of claim 1, in which said lens element is of optically finished glass.

10. The lens assembly of claim 9, in which said haptic means is of plastic.

11. The lens assembly of claim 9, in which said haptic means is of glass.

12. The lens assembly of claim 1, in which said lens element is of a first plastic material, and in which said haptic means is of a second plastic material.

13. The lens assembly of claim 1, in which said haptic means comprises two pieces of transparent sheet material laminated to opposite axial sides of said lens element and laminated to each other at regions radially outside said lens element.

14. The lens assembly of claim 1, in which said haptic means comprises two pieces of sheet material having registering circular apertures of diameter less than the outer diameter of said lens element, said sheet-material pieces being in lapped engagement with opposite axial sides of said lens element at the rim region thereof and being laminated to each other at regions radially outside said lens element.

15. The lens assembly of claim 1, in which said haptic means comprises a single piece of sheet material having a central aperture at which the periphery of said lens element is secured to said sheet material.

16. The lens assembly of claim 1, in which said lens element is of optically finished glass and said haptic means is of transparent glass sheet bonded to the posterior surface of said lens element.

17. The lens assembly of any one of claims 13, 14, 15 and 16, in which said haptic means in the region radially outside said lens element is fenestrated to an area extent which exceeds the remaining effective haptic area radially outside said lens element, and in which said remaining effective haptic area is at least twice the area of said lens element.

18. The lens assembly of claim 13 or claim 14, in which said haptic mean is characterized by multiple fenestrations in the region radially outside said lens element, the minimum width of all fenestrations in said region being substantially greater than the overall laminated thickness of said two pieces of sheet material.

19. The lens assembly of claim 1, in which said foot formations are four in number, at substantially equal angular spacing, each foot formation comprising angularly spaced generally radial leg elements integrally interconnected at their radially outer ends by a transverse bridge element.

20. The lens assembly of claim 19, in which said bridge element is generally arcuate about the central axis of said lens element.

21. The lens assembly of claim 19, in which the radial extent of one diametrically opposed pair of foot formations exceeds that of the other pair, thereby recognizably establishing a major-axis orientation that is characteristic of said haptic means.

22. The lens assembly of claim 21, in which said lens element is of optically finished glass, with an astigmatism-corrective axis having a predetermined angular orientation with respect to the characteristic major-axis orientation of said haptic means.

23. The lens assembly of claim 19, in which each of said leg elements is slotted along its length, the slot width being in excess of the thickness of said haptic means.

24. The lens assembly of claim 19, in which each said bridge element is slotted along its length, the slot width being in excess of the thickness of said haptic means.

25. The lens assembly of claim 9, in which said optically finished glass is photochromic.

26. The lens assembly of claim 1, in which said haptic means includes an annular region radially outside said lens element and of maximum diameter corresponding to the maximum diameter of the iris, said haptic means in said annular region being effectively opaque and characterized by external appearance decor and coloring to suit the eye of a patient and to simulate the iris of the patient, said foot formations extending radially outside said annular region.

27. The lens assembly of claim 26, in which said annular region is characterized by foraminous apertures of effective diameter less than substantially 0.005 inch and at least as great as the thickness of said annular region.

28. The lens assembly of claim 1, in which said haptic means is of thickness at least no greater than substantially 0.002 inch.

29. The lens assembly of claim 1, in which maximum thickness is at least no greater than substantially 0.006 inch (0.15 mm).

30. The lens assembly of claim 14, in which said sheet-material pieces are laminated to said lens element at lapped engagement with said rim region.

31. The lens assembly of claim 13 or claim 14, in which the respective sheet pieces are of different materials, the anterior piece being of lower inherent friction coefficient than the posterior piece.

32. The lens assembly of claim 13 or claim 14, in which the posterior surface of the posterior sheet piece is characterized by greater surface roughness than that of the anterior surface of the anterior sheet piece.

33. The lens assembly of claim 1, in which said haptic means integrally includes a peripherally continuous rim, said foot formations terminating at said rim.

* * * * *